United States Patent [19]

Spokoyny et al.

[11] Patent Number: 5,320,052
[45] Date of Patent: Jun. 14, 1994

[54] CATALYTIC SULFUR TRIOXIDE FLUE GAS CONDITIONING

[75] Inventors: Felix E. Spokoyny, Costa Mesa; Henry V. Krigmont, Seal Beach; Everett L. Coe, Jr., Downey; Barry A. Whyte, Corona Del Mar; Po L. Chien, Rancho Palos Verdes, all of Calif.

[73] Assignee: Wahlco Environmental Systems, Inc., Santa Ana, Calif.

[21] Appl. No.: 25,034

[22] Filed: Mar. 1, 1993

[51] Int. Cl.$^5$ .............................................. F23J 15/00
[52] U.S. Cl. ..................................... 110/345; 95/63; 95/69; 96/57; 110/185; 110/216; 422/177; 422/180; 423/242.1; 423/244.02
[58] Field of Search ..................... 423/244.01, 244.02, 423/242.1; 95/63, 69, 58; 96/57; 422/177, 180, 181; 110/345, 203, 216, 185

[56] References Cited

U.S. PATENT DOCUMENTS 5,244,642  9/1993  Hankins et al. ................... 423/242.1

Primary Examiner—Edward G. Favors
Attorney, Agent, or Firm—Howard E. Sandler

[57] ABSTRACT

A sulfur trioxide conditioning system includes a catalytic converter that converts a portion of the sulfur dioxide in a flow of flue gas to sulfur trioxide. The catalytic converter includes a catalyst support, which is disposed across at least a portion of the cross section of a main duct from a burner to a heat recovery apparatus, and a catalyst on the catalyst support. The amount of the catalyzed surface exposed to the flow of flue gas is selectively varied to control the conversion of sulfur dioxide to sulfur trioxide.

21 Claims, 6 Drawing Sheets

CATALYTIC SULFUR TRIOXIDE FLUE GAS CONDITIONING

BACKGROUND OF THE INVENTION

This invention relates to power plant operations, and, more particularly, to an approach for removing particulate matter from a flue gas stream produced in a fossil fuel power plant, especially a coal-fired power plant.

In a fossil fuel power plant, a fuel is burned in air to produce a flue gas. The flue gas heats water in a boiler to generate steam, which turns a turbine to produce power. After passing through various apparatus, the flue gas is exhausted through a stack to the atmosphere.

The flue gas includes solid particulate matter and a variety of gaseous contaminants. The maximum permissible emission levels of the particulate matter and gaseous contaminants are set by laws and regulations. The maximum emission levels are typically far less than the amounts present in the flue gas as it is produced, and various types of gas treatment apparatus are usually provided to reduce the particulate matter and gaseous contaminants in the flue gas before it leaves the stack.

In most fossil fuel power plants, particulate matter in the gas stream is removed by electrostatic precipitation. An electrostatic charge is applied to the particulate matter in the flue gas, and the flue gas passes between charged electrodes. The particulate matter is deposited upon the electrode having the opposite charge to that of the particulate and is later removed.

The fuel typically contains from about 0.5 percent to about 6 percent sulfur, which at least in part oxidizes to sulfur dioxide during combustion. A small part of the sulfur dioxide further oxidizes to sulfur trioxide. Since the combustion air and the fuel also contain moisture, the flue gas contains water vapor. The sulfur trioxide and water vapor in the flue gas react to produce sulfuric acid, which deposits upon the particulate matter. The sulfuric acid deposited upon the particulate matter imparts a degree of electrical conductivity to the particulate and promotes the electrostatic precipitation process.

If the fossil fuel contains too little sulfur so that there is a deficiency of sulfur trioxide and thence sulfuric acid in the flue gas, the electrostatic precipitator cannot function properly because of the high electrical resistivity of the particulate. It is therefore known to add sulfur trioxide from another source to the flue gas produced from burning low-sulfur fossil fuels. See, for example, U.S. Pat. No. 2,993,429.

In such a sulfur trioxide conditioning system, sulfur is burned to form sulfur dioxide, which is passed over a catalyst to achieve further oxidation to sulfur trioxide. The sulfur trioxide is injected into the flue gas flow upstream of the electrostatic precipitator. The amount of injected sulfur trioxide is controlled by varying the amount of sulfur that is burned.

Sulfur trioxide injection systems work well, and are widely used. In some instances, however, there are drawbacks. The catalytic conversion of sulfur dioxide to sulfur trioxide is not completely efficient, and additional sulfur dioxide is added to the flue gas flow. A constant supply of sulfur feedstock is required, and this feedstock must be safely handled. The several components of the burning, catalyzing, and injecting system must be kept in good working order, and there is a power consumption associated with the process.

U.S. Pat. No. 5,011,516 describes an alternate approach in which a slip stream of flue gas is drawn from the main flow and passed over a catalyst. A portion of the sulfur dioxide in the slip stream is oxidized to sulfur trioxide, and the slip stream is merged back into the main flue gas flow. While of interest, this approach has major drawbacks when implemented. System thermal efficiency is reduced because less heat is recovered. There is typically insufficient mixing of the slip stream and the main flow at the point where they rejoin due to an insufficient pressure differential.

Moreover, the '516 patent does not disclose any approach which permits control of the amount of sulfur trioxide produced, responsive to variations in the sulfur content of the fuel and changes in other operating parameters. A patent to a related approach, U.S. Pat. No. 3,581,463, suggests using a fan to draw a portion of the hot gas flow into the slip stream, but gives no further details as to how the amount of sulfur trioxide can be controlled. One can imagine that valving could be added to the slip stream to control its total flow, but such valves are complex, expensive, and difficult to build.

There is therefore a need for an improved approach to sulfur trioxide conditioning of flue gas streams. The present invention fulfills this need, and further provides related advantages.

SUMMARY OF THE INVENTION

The present invention provides an apparatus and method for sulfur trioxide conditioning of flue gas streams produced by fossil fuel power plants. This approach permits a selectively controllable amount of sulfur trioxide to be created and added to the flue gas stream. The apparatus used to accomplish the sulfur trioxide addition is simple and rugged, and readily controlled to precisely vary the sulfur trioxide addition. There is no sulfur burning apparatus or supply of sulfur required. No slip stream is taken from the flue gas stream, and no associated variable-speed fan or valving is used to achieve controllability. No additional sulfur dioxide is added to the flue gas stream with the sulfur trioxide addition. There is no difficulty in mixing the sulfur trioxide into the flue gas stream.

In accordance with the invention, a sulfur trioxide conditioning system is provided for use in a fossil fuel-burning facility having a main duct for transporting sulfur dioxide-containing flue gas from a boiler, through a heat recovery apparatus, and to particulate removal equipment for subsequent discharge through a stack. The sulfur trioxide conditioning system includes catalytic converter means for converting a portion of the sulfur dioxide in the flue gas to sulfur trioxide. The catalytic converter means includes a catalyst support adapted to be disposed across at least a portion of the cross section of a main duct, and a catalyst for the oxidation of sulfur dioxide to sulfur trioxide supported on the catalyst support. The conditioning system further includes adjustment means for selectively adjusting the amount of surface area of the catalyst which is exposed to a flow of flue gas in the main duct.

The present approach utilizes a catalyst to aid in the oxidation of sulfur dioxide in the flue gas flow to sulfur trioxide. The catalyst is coated onto, impregnated into, or integral with the portion of the catalyst support that is disposed in the flue gas stream at a location having the correct temperature to accomplish the catalyzed oxidation. The amount of sulfur trioxide produced is controlled by selectively adjusting the amount of catalyst-covered surface that is exposed to the flue gas stream.

The preferred approach to adjusting the amount of sulfur trioxide produced is to place a shield over a portion of the catalyst-covered surface. The shield prevents active contact between the flue gas flow and the covered portion of the catalyzed surface, thereby preventing the covered portion from catalyzing the oxidation of sulfur dioxide. The greater the exposed surface area of catalyst, the greater the conversion of sulfur dioxide to sulfur trioxide. In a preferred approach, the shield is slidably disposed in relation to the catalyst-covered surface, and can controllably slide to expose more or less of the surface to the flue gas stream. The shield is preferably arranged so that it first exposes the downstream end of the catalyzed surface and controllably exposes increasing amounts of the upstream portion of the catalyzed surface as more exposure of the catalyzed surface is needed. The shield serves the important function of reducing erosion damage to the catalyst on the catalyst support, and of permitting compensation for the effects of ageing of the catalyst.

This approach lends itself to an automated control system. Operating parameters of the system are measured, such as, for example, boiler load, flue gas composition, electrostatic precipitator power consumption, fly ash properties, fly ash resistivity, and/or stack gas opacity. These parameters are provided to a controller, which determines whether any change in the sulfur trioxide level is required, and, if so, the nature of the change required. The shield is moved, if necessary, to change the amount of exposed catalyst surface area responsive to these measured operating parameters.

This approach provides a major advance over the art. Where a catalyst-based conditioning system is required, the present approach achieves conditioning without creating a varying back pressure in the flue gas. The adjustment/shield movement mechanism is rugged and reliable, and can be precisely controlled. No special valving is required. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
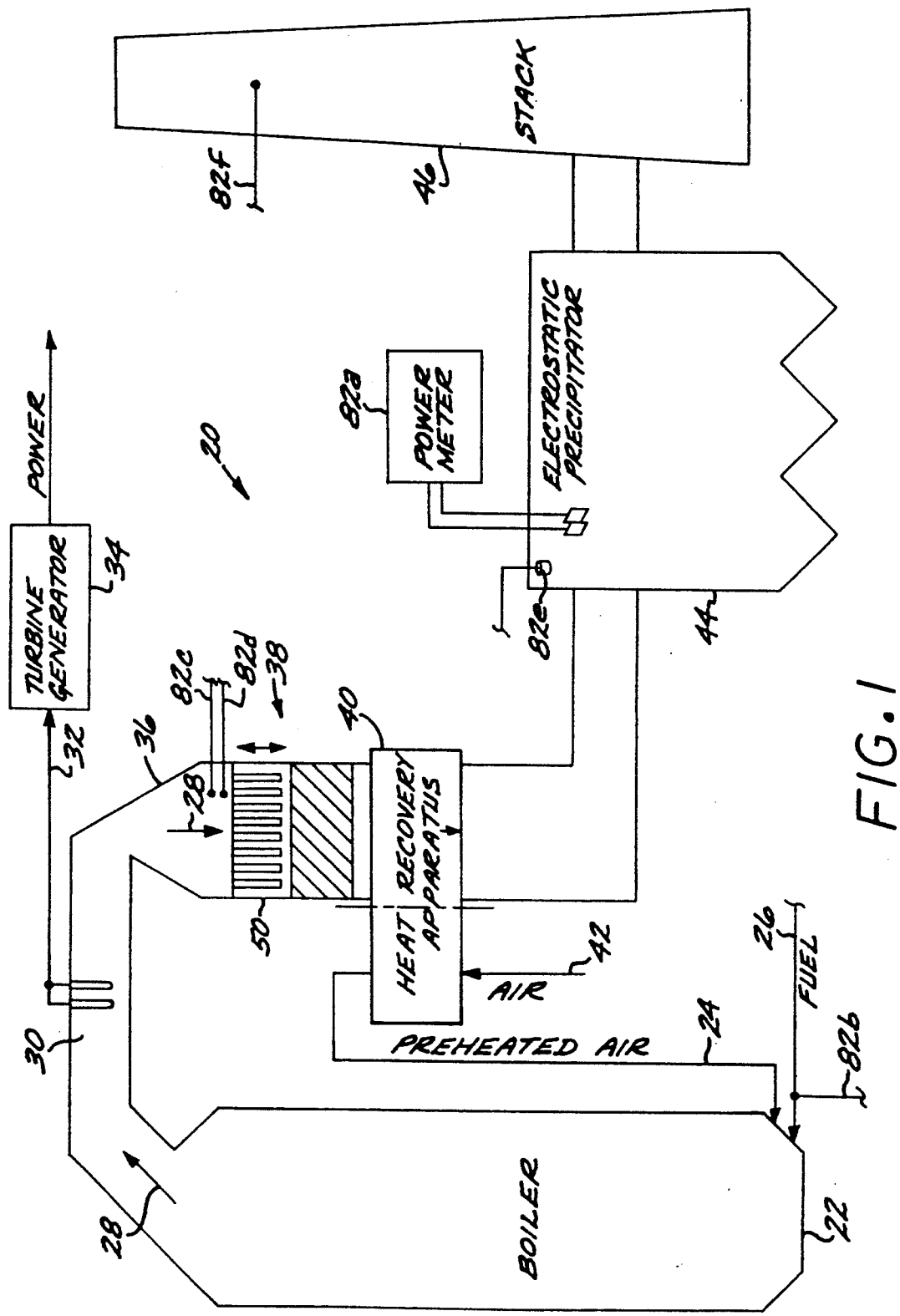
FIG. 1 is a schematic layout of a fossil fuel power plant.
Figure 2:
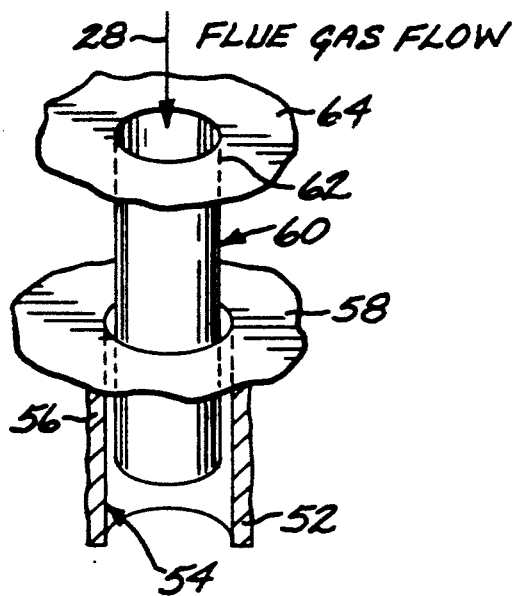
FIG. 2 is a perspective view of a tubular catalytic converter and shield arrangement.

FIG. 1 schematically illustrates a fossil fuel power plant 20 utilizing the apparatus and approach of the present invention. Briefly, the power plant 20 has a combustor/boiler 22, to which are supplied a preheated air flow 24 and a fuel flow 26. The fuel is combusted with the air, producing a flue gas flow 28. The flue gas flow contains particulate matter (sometimes called fly ash), as well as the hot combustion products. The flue gas flow 28 passes through a steam generator 30, which boils water to steam 32. The steam 32 drives a turbine/generator 34, producing power.

The flue gas flows through a duct 36 and thence through a sulfur trioxide conditioning system 38. The flue gas flow 28 passes through a heat recovery apparatus 40, which in one embodiment is an air preheater, wherein heat is transferred from the flue gas flow to an incoming air flow 42, to produce the preheated air flow 24. After leaving the heat recovery apparatus 40, the flue gas enters an electrostatic precipitator (ESP) 44, in which a large fraction of the particulate matter is removed by the application of electrostatic fields to the flue gas. The flue gas flow, with most particulate removed, flows out of the power plant 20 through an exhaust stack 46. It will be appreciated that this description is highly simplified, and is intended only to present the relevant portions of the general structure in which the present conditioning system is used. Additional gas cleanup apparatus, controllers, and other features are usually present in addition to those discussed.

The flue gas flow entering the electrostatic precipitator 44 must have enough sulfur trioxide to react with water vapor in the flue gas to produce a sufficient amount of sulfuric acid, which is deposited upon the surfaces of the particles. The sulfuric acid imparts electrical conductivity to the particulate in the flue gas, so that the accumulated particulate on the electrostatic precipitator plates can conduct a current flow. Otherwise, the first of the particulate to be deposited would insulate the plates and inhibit their further operation. Sufficient sulfur trioxide must be present to form the necessary sulfuric acid.

In the present approach, sulfur trioxide is produced in the sulfur trioxide conditioning system 38 by a catalyzed oxidation of sulfur dioxide in the flue gas flow 28 to sulfur trioxide. The catalyzed oxidation is preferably accomplished at a temperature above 400° F., and preferably in the range 400°F.–1400° F. In most power plants, the flue gas flow 28 has this temperature range as it flows through the portion of the duct 36 between the steam generator 30 and the heat recovery apparatus 40, and the conditioning system 38 is therefore placed in this portion of the duct.

The sulfur trioxide conditioning system 38 preferably is constructed of two basic subassemblies, a catalytic converter, including a catalyst support 48, and an adjustment mechanism 50. The catalytic converter converts a portion of the sulfur dioxide in the flue gas to sulfur trioxide. The catalyst support 48 is preferably provided as a plurality of individual catalyzed elements that are distributed substantially across the entire cross-section of the duct 36, as will be discussed subsequently. The catalyst is normally applied as a layer onto the surface of the catalyst support elements or impregnated into the catalyst support elements. Any catalyst for the oxidation of sulfur dioxide to sulfur trioxide can be used.

Examples of such catalysts include vanadium oxide, alkali metal pyrosulfates, and alkali metal oxides.

The second part of the sulfur trioxide conditioning system 38 is the adjustment mechanism 50. The adjustment mechanism 50 controllably varies the amount of catalyzed surface area of the catalyst support 48 that is exposed to the flue gas flow 28. Any operable mechanism for controllably adjusting the surface area may be used, and the preferred approach will be discussed subsequently.

FIGS. 2-5 illustrate one preferred type of conditioning system 38. The catalyst support includes a plurality of hollow tubes 52 disposed so that the tube axis is parallel to the local flue gas flow 28, FIG. 2. A catalyst 54 is coated onto, impregnated into, or integral with the inside of each of the tubes 52, and is preferably in the form of a thin layer at the inner surface of the tubes 52. Flue gas passing through the interior of the tubes 52 contacts the catalyst 54, which catalyzes the oxidation of sulfur dioxide to sulfur trioxide.

Figure 3:
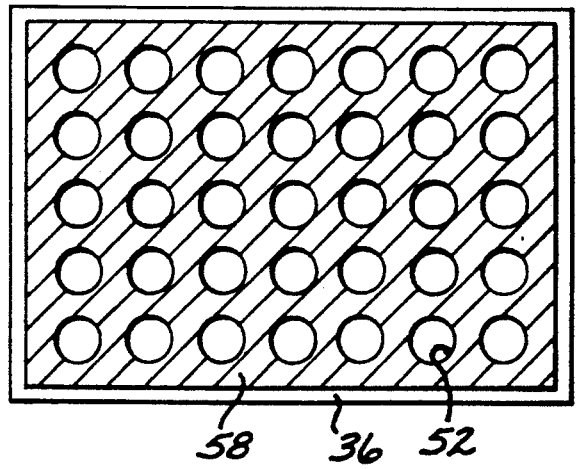
FIG. 3 is a plan view of one embodiment of the tubular catalytic converter of FIG. 2.

Each of the tubes 52 is fixed and sealed at an upper (upstream) end 56 to a tube support 58 which extends across substantially the entire cross section of the duct 36, and is sealed to the walls of the duct 36, see FIG. 3. The entire flue gas flow 28 is thereby forced to pass through the tubes 52.

To control the extent of the conversion, a tubular shield 60 is provided for each of the tubes 52. The shield 60 is dimensioned to slide within the interior of the tube 52. There need not be, and is preferably not, a close dimensional fit between the outer diameter of the shield 60 and the inner diameter of the tube 52, to avoid binding between the tube 52 and the shield 60 as the two slide past each other. An upper end 62 of the shield 60 is supported in a shield support 64 that can be raised or lowered to controllably insert the shield 60 into the tube 52 to different degrees.

In operation, the flue gas flows through the interior of the shield 60. As the flue gas 28 flows out of the shield 60, it can first contact the catalyst 54 on the interior of the tube 52. The further the shield 60 is inserted into the tube 52, the further downstream is the point at which the flue gas flow first contacts the catalyst, the shorter the contact time between the flue gas and the catalyst, and the lower the fractional conversion of sulfur dioxide to sulfur trioxide.

Figure 4:
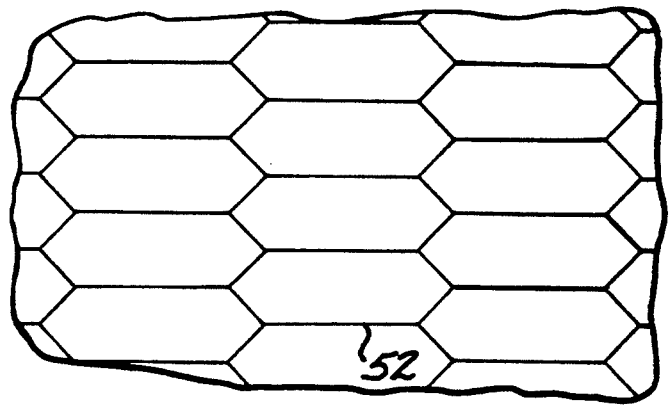
FIG. 4 is a plan view of another embodiment of the tubular catalytic converter of FIG. 2.

FIG. 3 shows in plan view one arrangement for the tubes 52 and tube support 58. Here the tubes 52 are integral with the tube support 58, which extends between the tubes 52. The tube support 58 may be sealed to the walls of the duct 36, or in some cases a close but unsealed fit may be sufficient to prevent substantial flow of flue gas past the catalyst-support tubes 52. FIG. 4 shows an alternative arrangement illustrating two points. First, the tubes 52 need not be circular in cross section, and can have other shapes such as the hexagonal. Second, there need not be a separate tube support 58. The tubes 52 can be joined together in the manner of a honeycomb structure, so that the structural walls of the tubes also provide the tube support.

Figure 5:
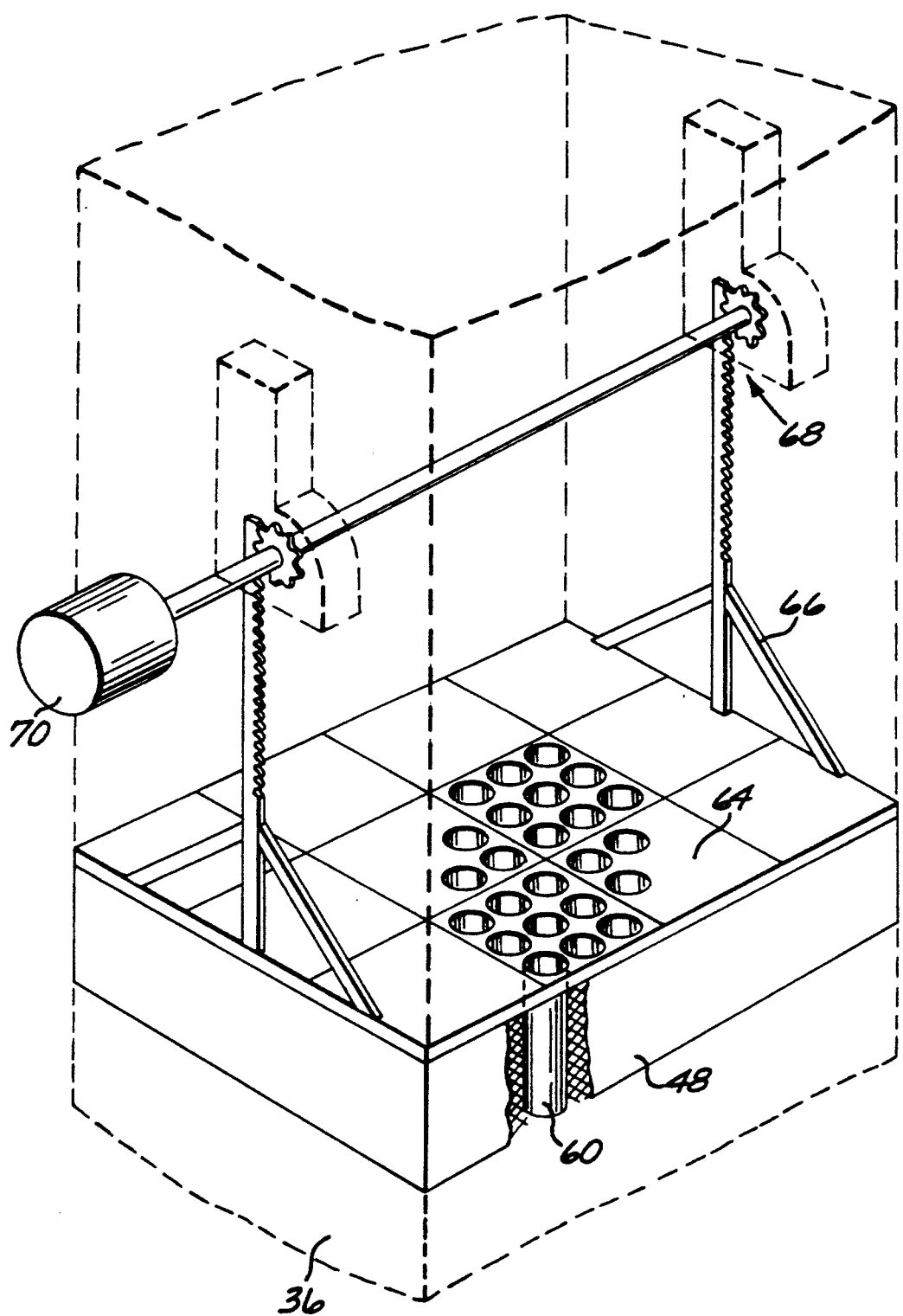
FIG. 5 is a perspective view of an adjustment mechanism operable with the apparatus of FIG. 2.

FIG. 5 illustrates a preferred adjustment mechanism 50. The shield support 64 is supported by structural members 66 from a rack-and-pinion mechanism 68. Motors 70, preferably located external to the duct 36 and acting through a shaft that passes through the duct walls on a sealed bearing, drive the structural members 66 upwardly and downwardly, moving the shield support 64 upwardly and downwardly. This movement in turn moves the shields 60 upwardly and downwardly within the tubes 52 (not shown in FIG. 5, but see FIG. 2), accomplishing the required controllable adjustment discussed in the prior paragraphs. The motors 70 and rack-and-pinion mechanism 68 are protected from the erosive effects of the particulate-laden flue gas by covers and seals.

Figure 6:
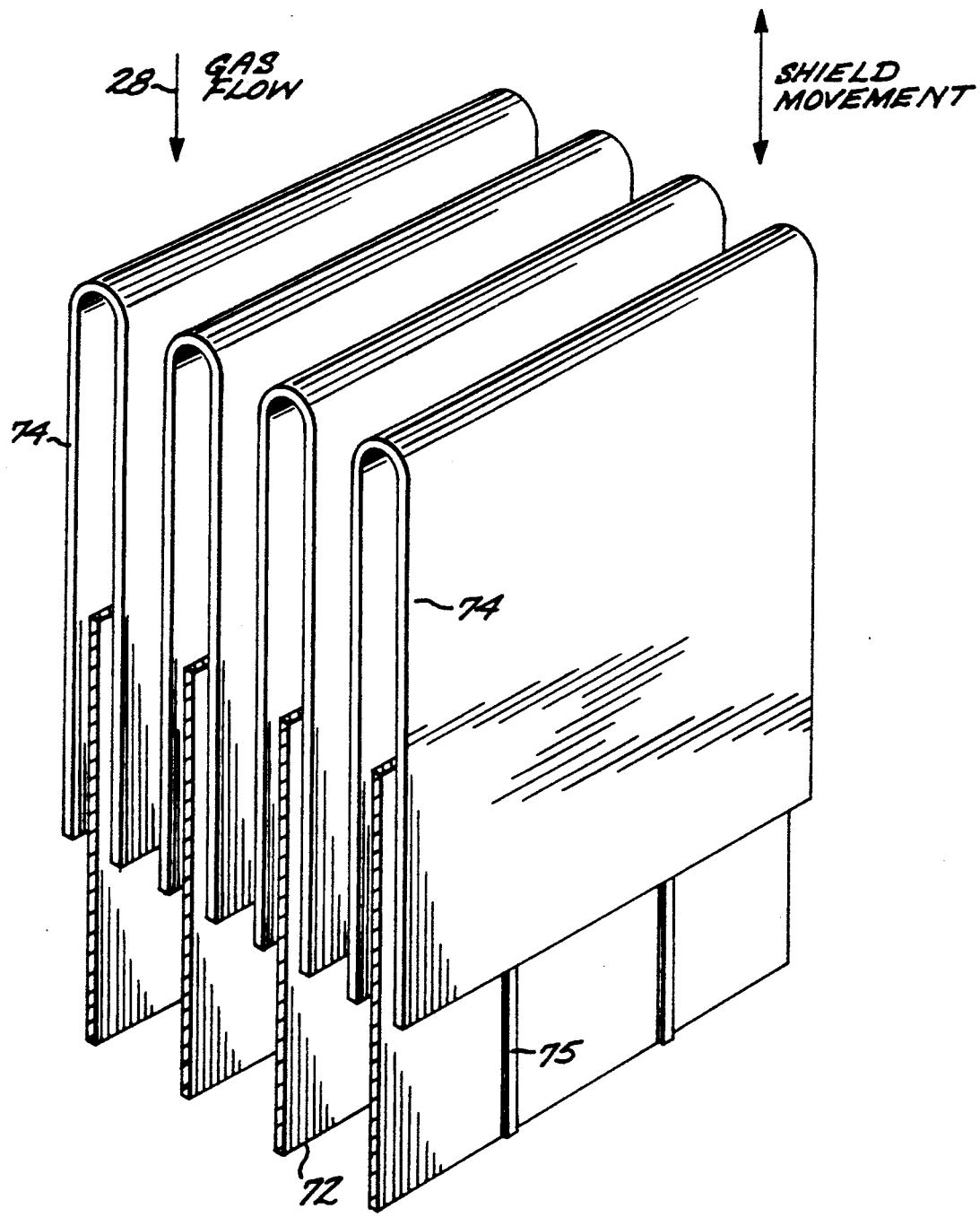
FIG. 6 is a perspective view of a plate-type catalytic converter and shield arrangement.
Figure 7:
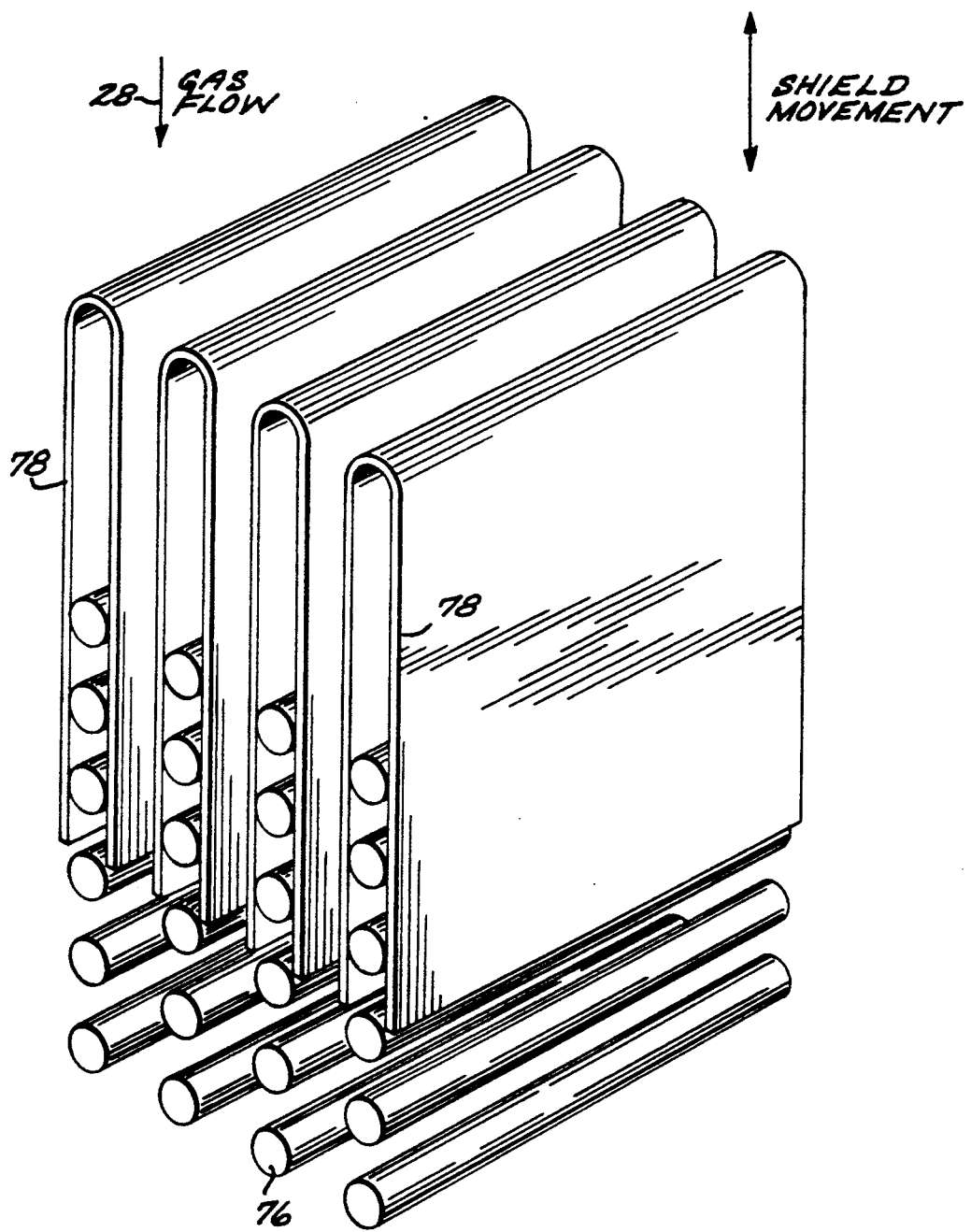
FIG. 7 is a perspective view of a transverse cylindrical catalytic converter and shield arrangement.

FIGS. 6 and 7 depict two other configurations for the catalytic converter and adjustment mechanism. In FIG. 6, the catalyst support is a flat plate 72, and a plurality of such plates are provided. The plates lie parallel to the flow 28 of flue gas, so that the presence of the plates 72 adds minimal pressure drop to the flow 28. Catalyst is coated onto, impregnated into, or integral with the surfaces of the plates 72. A sliding shield 74 controllably covers the plates 72 in the same manner described above for the shield 60. The shield 74 is moved by an adjustment mechanism like that shown in FIG. 5. As an aid in guiding the smooth sliding operation of the shield over the plates, the plates may be provided with channels 75 that extend parallel to the flue gas flow 28 and the direction of sliding of the shield 74. A corresponding feature (not shown) in the interior wall of the shield 74 loosely engages each channel 75 to guide the sliding of the shield 74 over the plate 72.

The conditioning system of FIG. 7 is similar to that of FIG. 6, except that a series of horizontal cylinders 76 replace the plates 72 to act as the catalyst support. The outer surfaces of the cylinders 76 are coated with, impregnated with, or otherwise provided with catalyst. A shield 78 controllably covers incrementally larger or smaller numbers of the cylinders 76 as it slides upwardly and downwardly, adjustably varying the fractional conversion of sulfur dioxide to sulfur trioxide.

The adjustment mechanism using a shield that can be withdrawn to expose a varying amount of the catalyzed surfaces, such as shown in FIGS. 5-7, yields important benefits. It allows precise control of the extent of conversion of sulfur dioxide to sulfur trioxide in the flue gas flow. It protects the upper ends of the catalyst supports from erosion. This approach permits compensation for catalyst ageing. As the catalyst is used for longer times in the power plant, its effectiveness declines somewhat. With the present approach, the extent of coverage of the catalyst plates can be varied responsive to this change in catalyst behavior. For example, if a particular degree of sulfur dioxide conversion requires 1.00 square meters of catalyzed surface area when the catalyst is newly applied, the ageing of the catalyst over time may reduce its effectiveness such that 1.05 square meters is required for the same conversion effect. The present system can compensate for this change in the properties of the catalyst simply by exposing the required additional amount of catalyzed surface as the catalyst ages. Control is readily achieved with the control system described subsequently.

The present approach has the further advantages that the adjustment of exposed catalyst, and thence the production of sulfur trioxide in the flue gas, is made without changing the pressure loss and back pressure in the gas duct 36. The gas flow distribution and sulfur trioxide distribution in the flue gas duct can even be improved, by selection of the nature and distribution of the catalyst supports. For example, if there is an uneven temperature naturally in the duct, then the distribution of catalyst or its exposed area can be selected so that the production of sulfur trioxide matches the spatially varying requirements of the flue gas.

Figure 8:
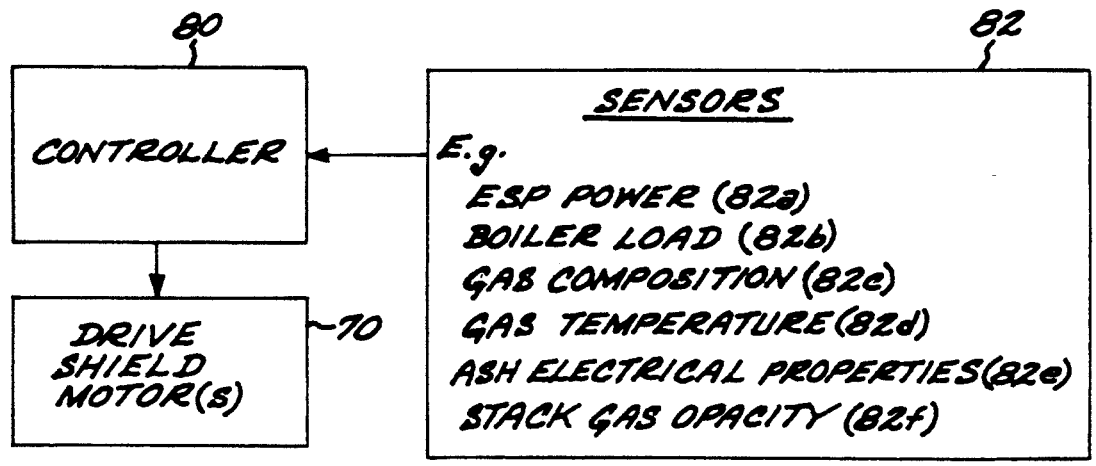
FIG. 8 is a block diagram of a control system for the catalytic converter and shield arrangement.

The present approach is particularly suitable for direct automatic control of the adjustment mechanism 50. As shown in FIG. 8, a microprocessor controller 80 controls the motors 70 of the adjustment mechanism 50. The controller 80 receives input from a sensor 82 (or sensors) that measure the status of one or more operating parameters of the power plant 20. The operating parameters are chosen to be, singly or in combination, indicative of the total amount of sulfur trioxide required in the flue gas flow 28. Such parameters can include, by way of example and not of limitation, the power consumed by the electrostatic precipitator 44 (a measure of the amount of particulate being collected), sensor 82a, the boiler load, sensor 82b, the chemical composition of the flue gas including the sulfur dioxide and sulfur trioxide contents, sensor 82c, the exhaust gas temperature, sensor 82d, the electrical properties of the fly ash particulate such as its resistivity, sensor 82e, or the stack gas opacity, sensor 82f. The construction of each of these types of sensors is well known in the art, but their present application is novel.

As an example of a control approach, the power consumption of the electrostatic precipitator 44 (sensor 82a) and the sulfur trioxide content (sensor 82c) of the stack gas may be monitored. The controller 80 moves the shield incrementally by operating the motors 70. The controller 80 monitors the power consumption and its change over time. If the power consumption rises with a change in the sulfur trioxide content, then it is concluded that the change in sulfur trioxide produced by the adjustment of the conditioning system caused a desirable increase in particulate removal and not just an increase in stack gas sulfur trioxide. On the other hand, if the sulfur trioxide increases without an increase in power consumption, the controller reverses the perturbation. A number of control strategies of this type are possible. This control approach for the exposed catalyzed area may be integrated with that of U.S. Pat. No. 5,122,162, whose disclosure is incorporated by reference.

Figure 9:
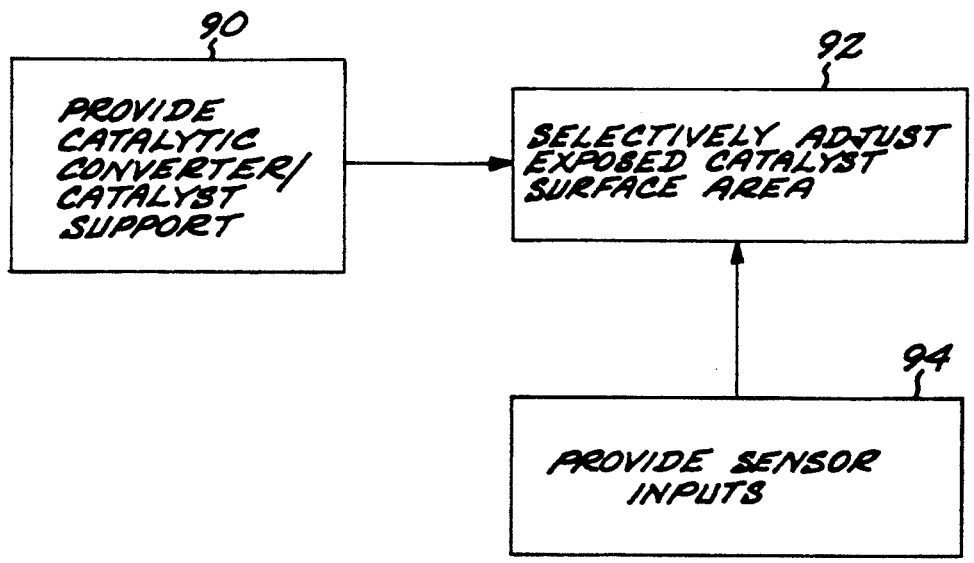
FIG. 9 is a diagram of a process for converting sulfur dioxide to sulfur trioxide in a flue gas flow.

FIG. 9 depicts the methodology of the invention in block diagram form. The catalytic converter/catalyst support as previously described is provided, numeral 90. The exposed area of the catalyzed surfaces of the catalyst support is selectively adjusted using the adjustment mechanism, numeral 92. Sensor inputs are provided as an aid in making these adjustments, numeral 94.

The present invention thus substantially improves power plant operations by providing the required amount of sulfur trioxide for efficient electrostatic precipitator operation, without adding more sulfur oxides to the system and in a fully controlled manner. To the contrary, the amount of sulfur dioxide in the system is reduced. Although particular embodiments of the invention have been described in detail for purposes of illustration, various modifications may be made without departing from the spirit and scope of the invention. Accordingly, the invention is not to be limited except as by the appended claims.

What is claimed is:

1. A sulfur trioxide conditioning system for use in a fossil fuel-burning facility having a main duct for transporting sulfur dioxide-containing flue gas from a boiler, through a heat recovery apparatus, and to particulate removal equipment for subsequent discharge through a stack, the sulfur trioxide conditioning system comprising:

catalytic converter means for converting a portion of the sulfur dioxide in the flue gas to sulfur trioxide, the catalytic converter means including
   a catalyst support adapted to be disposed across at least a portion of the cross section of a main duct, and
   a catalyst for the oxidation of sulfur dioxide to sulfur trioxide supported on the catalyst support; and
adjustment means for selectively adjusting the amount of a surface area of the catalyst on the catalyst support which is exposed to a flow of flue gas in the main duct.

2. The sulfur trioxide conditioning system of claim 1, wherein the adjustment means includes
   a shield that movably fits over the catalyst support; and
   a mechanism that selectively causes the shield to move relative to the catalyst support to expose a selectable amount of the surface of the catalyst support to the flow of flue gas.

3. The sulfur trioxide conditioning system of claim 1, wherein the catalyst support is elongated, and the elongated direction lies parallel to the flow of flue gas.

4. The sulfur trioxide conditioning system of claim 1, wherein the catalyst support is substantially planar.

5. The sulfur trioxide conditioning system of claim 4, wherein the catalyst support further includes a channel therein parallel to the flow of flue gas.

6. The sulfur trioxide conditioning system of claim 4, wherein the catalyst support comprises a plurality of plates.

7. The sulfur trioxide conditioning system of claim 1, wherein the catalyst support is tubular.

8. The sulfur trioxide conditioning system of claim 7, wherein the adjustment means includes
   a tubular shield that movably fits inside the catalyst support; and
   a mechanism that selectively causes the shield to move relative to the tubular catalyst support to expose a selectable amount of the surface of the catalyst support to the flow of flue gas.

9. The sulfur trioxide conditioning system of claim 1, wherein the catalyst support comprises a plurality of tubes.

10. The sulfur trioxide conditioning system of claim 1, wherein the catalytic converter means comprises
    a plurality of spaced hollow tubes extending in the direction of the flow of flue gas, the catalyst being supported on the interior walls of the plurality of tubes, and
    a supporting assembly to which an upstream end of each of the tubes is attached, the supporting assembly being adapted to extend transversely to the flow of flue gas.

11. The sulfur trioxide conditioning system of claim 1, wherein the catalyst is selected from the group consisting of a vanadium oxide, an alkali metal pyrosulfates, and an alkali metal oxides.

12. The sulfur trioxide conditioning system of claim 1, further including
    control means for controlling the adjustment means.

13. The sulfur trioxide conditioning system of claim 12, wherein the control means includes
    measuring means for measuring an operating parameter of a fossil fuel-burning facility indicative of the total amount of sulfur trioxide required in the flow of flue gas; and selection means for selecting the position of the adjustment means, responsive to the measuring means.

14. The sulfur trioxide conditioning system of claim 13, wherein the selection means is operable to modulate the amount of surface area of the catalyst which is exposed to a flow of flue gas in the main duct, as the total amount of sulfur dioxide in the flow of flue gas changes.

15. A method for converting sulfur dioxide to sulfur trioxide in a flow of a flue gas in a fossil fuel power plant, comprising the steps of
providing a catalytic converter having a catalyst support and a catalyst supported thereon, the catalyst being operable to catalyze the oxidation of sulfur dioxide to sulfur trioxide; and
selectively adjusting the amount of surface area of the catalyst which is exposed to a flow of flue gas.

16. The method of claim 15, including the additional step of
measuring an operating parameter of a fossil fuel-burning facility indicative of the total amount of sulfur trioxide required in the flow of flue gas, and wherein the step of selectively adjusting is operable responsive to the operating parameter measured in the step of measuring.

17. The method of claim 15, wherein the step of selectively adjusting includes the step of
moving a shield relative to the surface supporting the catalyst to expose a selected amount of the surface to the flow of flue gas.

18. A fossil fuel-burning plant, comprising:
a source of a flow of flue gas, the source including a burner of a fossil fuel;
a heat recovery apparatus that preheats air to be supplied to the burner;
apparatus for removing particulate matter from the flow of flue gas;
a main duct extending from source of a flow of flue gas to the heat recovery apparatus and thence to the apparatus for removing particulate matter;
catalytic converter means for converting a portion of the sulfur dioxide in the flue gas to sulfur trioxide, the catalytic converter means including a catalyst support having a catalyst supported thereon and being adapted to be disposed across at least a portion of the cross section of the main duct; and
adjustment means for selectively adjusting the amount of surface area of the catalyst which is exposed to the flow of flue gas in the main duct.

19. The plant of claim 18, further including
control means for controlling the adjustment means.

20. The plant of claim 19, wherein the control means includes
measuring means for measuring an operating parameter of the plant indicative of the apparatus for removing particulate matter; and
selection means for selecting the adjustment of the adjustment means, responsive to the measuring means.

21. The plant of claim 20, wherein the selection means is operable to modulate the amount of surface area of the catalyst which is exposed to a flow of flue gas in the main duct.

* * * * *